United States Patent [19]
Wakamatsu et al.

[11] 3,952,286
[45] Apr. 20, 1976

[54] TIME MULTIPLEXED ELECTRIC WIRING SYSTEM FOR CONTROL AND MONITORING OF FIELD POINTS

[75] Inventors: Hisato Wakamatsu; Hiroshi Arai, both of Toyota; Akira Kuno, Nagoya; Shigeyuki Akita, Okazaki, all of Japan

[73] Assignees: Nippon Soken, Inc., Nishio; Toyota Jidosha Kogyo Kabushiki Kaisha, Toyota, both of Japan

[22] Filed: July 26, 1974

[21] Appl. No.: 492,204

[30] Foreign Application Priority Data
July 28, 1973 Japan.................................. 48-85130

[52] U.S. Cl. ................................................ 340/163
[51] Int. Cl.² ......................................... H04Q 9/00
[58] Field of Search........... 340/147 LP, 163, 167 R

[56] References Cited
UNITED STATES PATENTS

| | | | |
|---|---|---|---|
| 3,564,280 | 2/1971 | Sognefest........................ | 340/163 X |
| 3,634,826 | 1/1972 | Biederman...................... | 340/167 R |
| 3,701,101 | 10/1972 | Heiz.................................... | 340/163 |
| 3,818,447 | 6/1974 | Craft............................. | 340/147 LP |
| 3,821,706 | 6/1974 | Bennett et al. ...................... | 340/163 |
| 3,828,313 | 8/1974 | Schull et al......................... | 340/163 |
| 3,854,122 | 12/1974 | Cross.............................. | 340/163 X |

*Primary Examiner*—Donald J. Yusko
*Attorney, Agent, or Firm*—Cushman, Darby & Cushman

[57] ABSTRACT

There is provided an electric wiring system in which a plurality of electric components, a plurality of command switches for actuating the electric components and a plurality of sensors, etc., are provided at various points of an automotive vehicle, transmitting and receiving units of time-shared pulse transmission type which are arranged at the various points of the vehicle are interconnected through a plurality of electric wires or lines, the electric components or loads are divided into a plurality of locals each thereof including a group of the loads, and the transmission and reception of information between the respective locals and a command section is effected by a time-shared pulse transmission method, whereby reducing the hazard of short-circuit fault.

9 Claims, 7 Drawing Figures

TIME MULTIPLEXED ELECTRIC WIRING SYSTEM FOR CONTROL AND MONITORING OF FIELD POINTS

BACKGROUND OF THE INVENTION

1. Field of the Invention

The present invention relates to an electric wiring system in which a plurality of electric components (such as head lamps), a plurality of command switches for actuating the electric components and a plurality of sensors are arranged at various points of a vehicle, particularly an automotive vehicle, and the actuation of the electric components is effected by means of a plurality of time-shared pulse transmission type transmitting and receiving units which are suitably arranged at various points of the vehicle and which are interconnected by means of a plurality of lines.

2. Description of the Prior Art

In known electric wiring systems, it has been customary to use as many electric wires or cables as there are independent electric components to carry electricity between a group of such electric components and a group of command switches. Consequently, this conventional electric wiring system requires a large number of heavy wires for carrying electricity, thus not only increasing the costs required for the electric wiring of the vehicle, but also increasing the volume and weight of the wires with resultant wiring difficulties. In addition, the probability of occurrence of a short-circuit between the vehicle body and the individual electric components is correspondingly high.

SUMMARY OF THE INVENTION

It is an object of the present invention to provide an electric wiring system in which groups of electric components or loads are divided into separate locals, and the transmission and reception of information between the individual locals and a command section is accomplished by a time-sharing pulse method, whereby reducing the cost, volume and weight of the wires used and decreasing the probability of occurrence of short-circuit fault.

It is another object of the present invention to provide such electric wiring system which can be satisfactorily handled by those mechanics who engage in ordinary servicing of automobiles and who do not possess any specialized knowledge required for handling the conventional time-sharing pulse systems.

The principle of the invention, together with additional objects and advantages thereof will be best understood from the following detailed description of a specific embodiment taken in conjunction with the accompanying drawing.

DESCRIPTION OF THE PREFERRED EMBODIMENT

Figure 1:
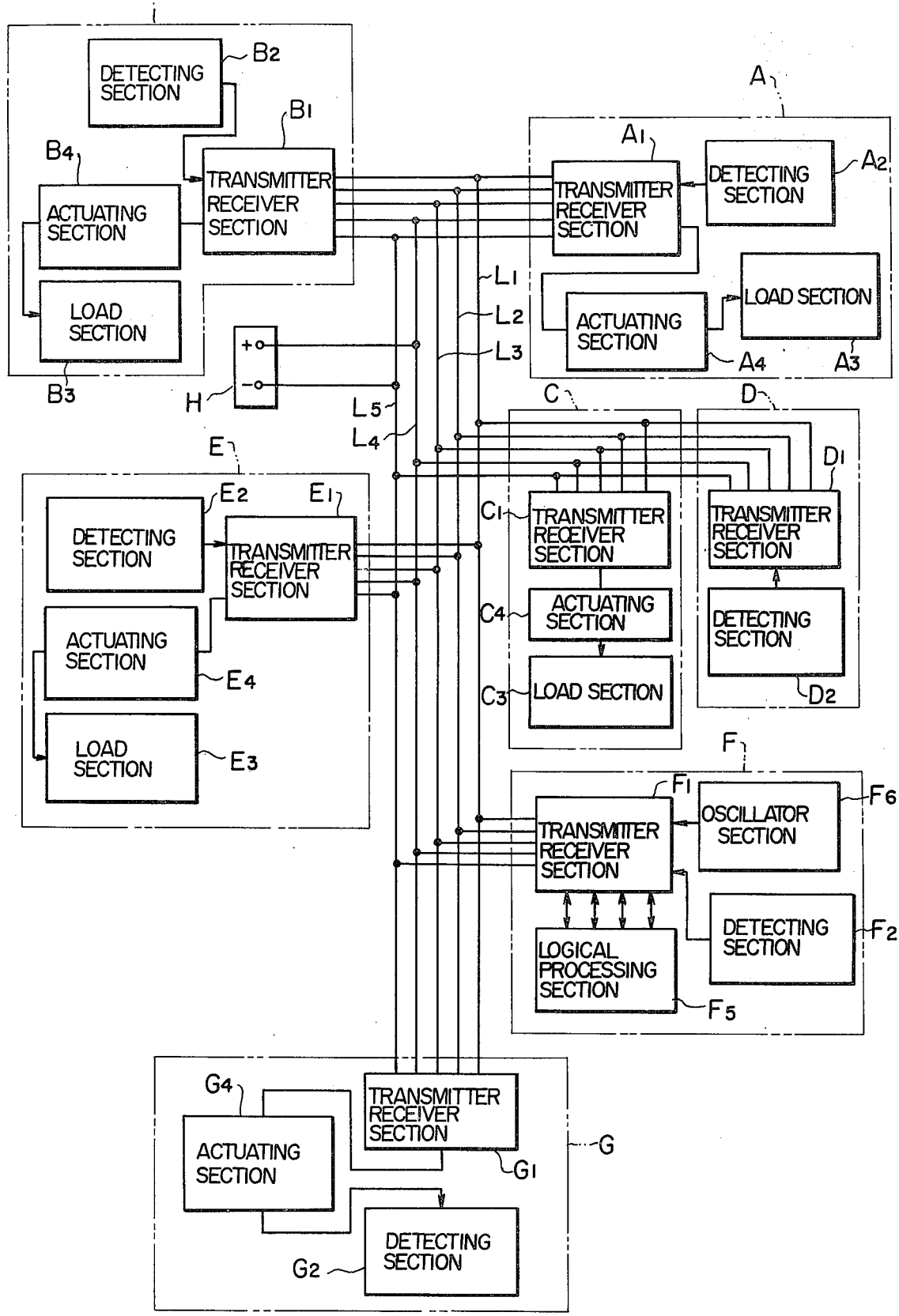
FIG. 1 is a block diagram showing the general construction of an electric wiring system according to the present invention.

Referring first to the block diagram of FIG. 1 showing the general construction of the entire automobile electric wiring system of the invention, a total of 7 blocks are provided, i.e., blocks A and B (hereinafter referred to as locals A and B) which respectively detect and control the condition and operation of left and right groups of devices installed in the engine room, a block C (hereinafter referred to as a local C) for controlling a group of instruments mounted on an instrument panel, a block D (hereinafter referred to as a local D) for detecting the condition of a group of devices mounted on a steering wheel column, a block E (hereinafter referred to as a local E) for detecting and controlling the condition and operation of a group of devices installed in a console box assembly, a block G (hereinafter referred to as a local G) for controlling a rear combination lamp, and a block F (hereinafter referred to as a local F) which serves as a logical processing section for the whole automobile. The respective locals A, B, C, D, E, F and G are interconnected only with three signal lines $L_1$, $L_2$ and $L_3$ and two supply lines $L_4$ and $L_5$ (positive and negative lines) connected to a battery H.

In the local A, symbol $A_1$ designates a transmitter and receiver section, $A_2$ a detecting section comprising a plurality of detecting means composed of switches and sensors for detecting the condition of a group of devices, $A_3$ a group of devices such as lamps and motors (hereinafter referred to as a load section), $A_4$ an actuating section for actuating the loads in the load section in response to the output of the transmitter and receiver section $A_1$. Similarly, in the local B, symbol $B_1$ designates a transmitter and receiver section, $B_2$ a detecting section, $B_3$ a load section, $B_4$ an actuating section. In the local C, symbol $C_1$ designates a transmitter and receiver section, $C_3$ is a load section, $C_4$ an actuating section; in the local D, $D_1$ a transmitter and receiver section, $D_2$ a detecting section; in the local E, $E_1$ a transmitter and receiver section, $E_2$ a detecting section, $E_3$ a load section, $E_4$ an actuating section; in the local G, $G_1$ a transmitter and receiver section, $G_2$ a load section, $G_4$ an actuating section; in the local F, $F_1$ a transmitter and receiver section, $F_2$ a detecting section, $F_5$ a logical processing section, $F_6$ an oscillator section for generating reference and synchronizing signals.

In FIG. 1, detecting sections $A_2$, $B_2$, $D_2$, $E_2$ and $F_2$, and load sections $A_3$, $B_3$, $C_3$ and $E_3$, form terminating means.

Figure 2:
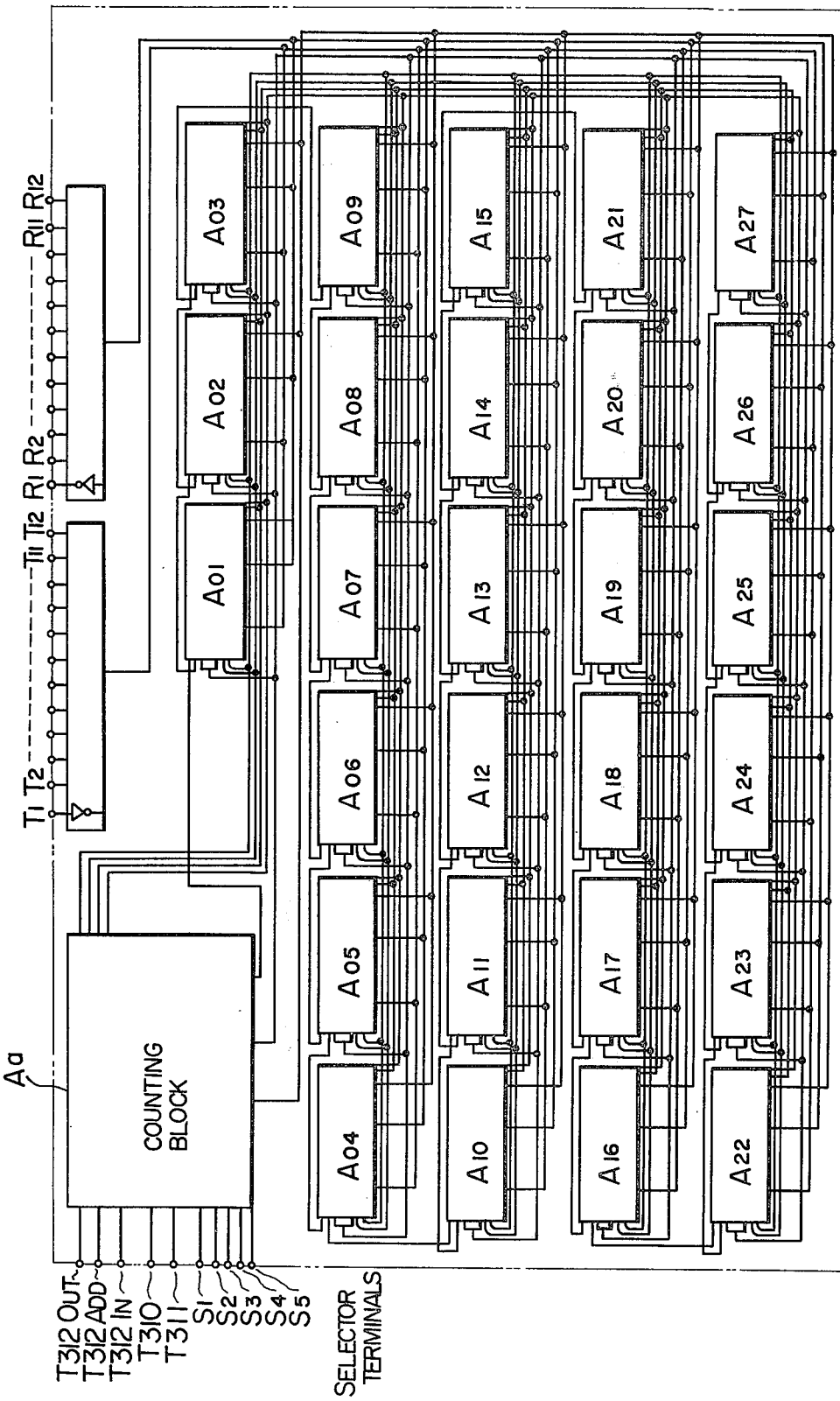
FIG. 2 is a block diagram showing the internal construction of a transmitter and receiver unit used in the system of this invention.

FIG. 2 is a block diagram showing one form of the transmitter and receiver units used in the respective local blocks. In FIG. 2, symbol $A_a$ designates a counting block, $A_{01}, A_{02}, \ldots, A_{27}$ transmitting and receiving blocks which serve the double function of transmitting and receiving signals, i.e., the transmitting and receiving blocks of the same type each thereof having both a transmitting circuit and a receiving circuit. Each of the transmitter and receiver sections $A_1$, $B_1$, $C_1$, $D_1$, $E_1$, $G_1$ and $F_1$ of the locals A, B, C, D, E, G and F includes a plurality of the transmitter and receiver units shown in FIG. 2.

This transmitter and receiver unit is usually fabricated in the form of a large scale integration (LSI) device, and the single counting block $A_a$ is selectively connected to the plurality of transmitting and receiving blocks $A_{01}, A_{02}, \ldots, A_{27}$ in accordance with the combination of signals applied to selector terminals $S_1, S_2, S_3, S_4$ and $S_5$ which may be either 0 or 1. Consequently, if the number of the selector terminals used is five, the number of the transmitting and receiving blocks is not limited to 27 as in the case of FIG. 2, but it may be increased to the maximum number of 32. In case the number of the selector terminals used is 6, then as many as 64 transmitting and receiving blocks may be used. Terminals $T_1, T_2, \ldots, T_{12}$ are connected to sensors which detect the condition of the respective electric devices assigned to the same local block, while terminals $R_1, R_2, \ldots, R_{12}$ are connected to actuating means which control the operation of the respective electric devices assigned to the same local block. A plurality of signal lines each respectively connected from each of said terminals $T_1, T_2, \ldots T_{12}$ and $R_1, R_2 \ldots R_{12}$ to each of said receiving blocks $A_{01}, A_{02} \ldots A_{27}$, are indicated, for convenience of illustration, by one line in FIG. 2. Designated $T312_{out}$ and $T312_{add}$ are connecting terminals to other transmitter and receiver units in the same block, and $T312_{in}$, T310 and T311 designate connecting terminals to other local blocks. The selection of the transmitting and receiving blocks is accomplished in the following manner. When it is desired to bring the transmitting and receiving blocks $A_{04}$ and $A_{05}$ into operation so that the signals from the switches or sensors in the same local are transmitted to the locals and signals are received from the other local to drive the loads such as the lamps or motors in the same local, the selector terminals $S_1, S_2, S_3, S_4$ and $S_5$ in one transmitter and receiver unit of the type shown in FIG. 2 are respectively set to 0, 0, 1, 0 and 0 signals to select and allow only the transmitting and receiving block $A_{04}$ to perform the transmitting and receiving functions, while the selector terminals $S_1, S_2, S_3, S_4$ and $S_5$ in another transmitter and receiver unit are respectively set to 1, 0, 1, 0 and 0 signals to select and allow only the transmitting and receiving block $A_{05}$ to perform the transmitting and receiving functions. In this way, the local A of FIG. 1 can serve the function of transmitting and receiving the necessary signals. On the other hand, if it is desired to bring, in the local B, the transmitting and receiving blocks $A_{01}, A_{02}$ and $A_{03}$ into operation to send the signals from the switches or sensors in the local B to the other locals and receive signals therefrom to actuate the loads such as the lamps or motors in the local B, the local B of FIG. 1 can serve all the necessary functions of transmitting and receiving the necessary signals by means of a total of three transmitter and receiver units, i.e., the first transmitter and receiver unit in which the selector terminals $S_1, S_2, S_3, S_4$ and $S_5$ (FIG. 2) are set to 1, 0, 0, 0 and 0 to select and allow only the transmitting and receiving block $A_{01}$ to perform its transmitting and receiving functions, the second transmitter and receiver unit in which the selector terminals $S_1, S_2, S_3, S_4$ and $S_5$ are set to 0, 1, 0, 0 and 0 to select and allow only the transmitting and receiving block $A_{02}$ to perform its transmitting and receiving functions and the third transmitter and receiver unit in which the selector terminals $S_1, S_2, S_3, S_4$ and $S_5$ are set to 1, 1, 0, 0 and 0 to select and allow only the transmitting and receiving block $A_{03}$ to perform its transmitting and receiving functions. This applies equally to other locals C, D, E, F and G, and the transmitter and receiver section of each local performs its desired functions by setting the selector terminals $S_1$ to $S_5$ of the necessary transmitter and receiver units of the same construction as shown in FIG. 2 to either 1 or 0 in the above-described manner.

Figure 3:
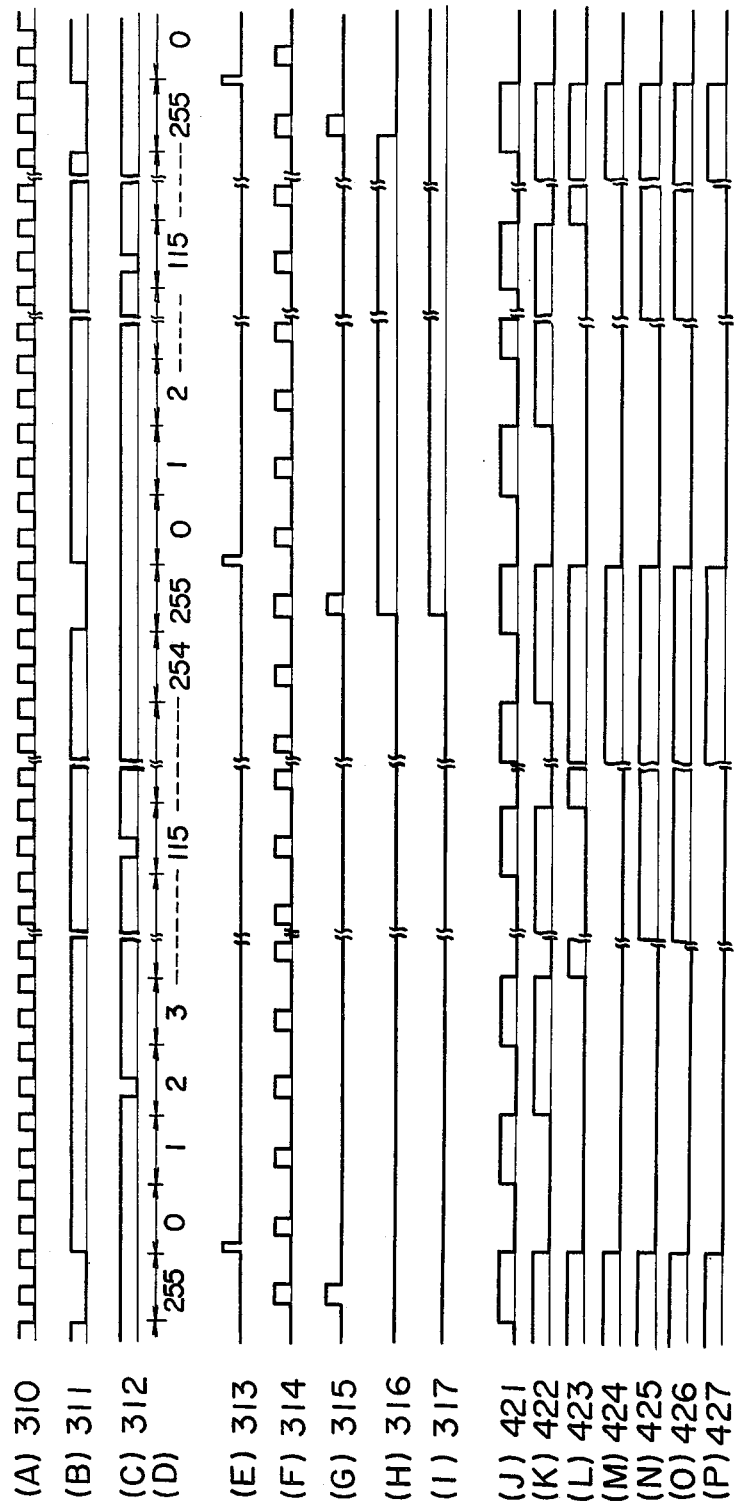
FIG. 3 is a diagram showing the waveforms generated at various points in the system of the invention.

Referring now to the signal waveforms of FIG. 3 which are generated at various points of the circuitry, the principle of the time-sharing pulse transmission method used with the embodiment shown in FIG. 1 will be outlined. Here, the time-sharing means a process in which the time base is divided as shown in FIG. 3(D) into equal periods, that is, smaller intervals 000, 001, 002, ..., 255 (hereinafter referred to as addresses), and the transmission and reception of signals among the transmitter and receiver sections of the respective locals are effected during the corresponding addresses.

The above-described time-shared addresses are provided by the counting blocks in the transmitter and receiver units of the respective locals on the basis of the synchronous signal 311 shown in FIG. 3(B) and the timing signal 310 shown in FIG. 3(A) which are delivered from the local F of FIG. 1, and these counting blocks generate address signals corresponding to these time-shared intervals. The signals to be transmitted from the transmitting side of the transmitter and receiver section in each local are combined and transmitted in the form of the level signal 312 shown in FIG. 3(C). Therefore, the transmission of signals among the respective locals are effected through three lines, i.e., lines $L_1$, $L_2$ and $L_3$ which respectively deliver the synchronous signal 311, the timing signal 310 and the level signal 312, while two additional lines $L_4$ and $L_5$ are provided for the purpose of power feeding. The synchronous signal 311 in which the address 255 of the time-shared addresses 000, 001, 002, ..., 255 has a low level is distributed to the counting block in each transmitter and receiver unit to produce from this signal 311 the reset signal 313 shown in FIG. 3(E) and this reset signal 313 is used to reset the frequency dividing circuit in the counting block. Each time-shared interval is superseded by the succeeding one every second period of the timing signal 310. Thus, the frequency dividing circuits provided in the transmitter and receiver units in the transmitter and receiver sections of the respective locals operate all in synchronism. The transmission of signals from the local A to any other local on the level signal 312 is effected as follows. One of the transmitting and receiving blocks $A_{01}$ through $A_{27}$ is preliminarily selected through the selector terminals $S_1, S_2, S_3, S_4$ and $S_5$ in each of the plurality of the transmitter and receiver units of FIG. 2, and then three input signals, i.e., a predetermined input signal to be transmitted, an address signal from the frequency dividing circuit corresponding to the time-shared address (such as the address 002 or 115) to which the input signal is allotted, and the strobe signal 314 shown in FIG. 4(F) are applied to an AND gate and the resultant level signal 312 is transmitted to any of other locals B, C, D, E, G and F. Similarly, the transmission of signals from each of the locals B, C, D, E, G and F to any other local is accomplished by means of the level signal 312 produced through the same process of operation just described. For example, the level signal 312 shown in FIG. 3(C) shows the case in which the signals to be transmitted are superposed respectively on the time-shared addresses 002 and 115. In accordance with the thus transmitted level signal 312 having the signal superposed on the address 002 or 115, only the specified transmitting and receiving block (e.g., the block $A_{01}$ or $A_{02}$) in the transmitter and receiver unit (FIG. 2) of the particular local of the locals A, B, C, D, E, F and G of FIG. 1 is brought into operation through the preselected selector terminals $S_1$, $S_2$, $S_3$, $S_4$ and $S_5$ to actuate the load in that particular local. In other words, the initial state is established by applying to the reset input of a first memory circuit the reset signal 313 shown in FIG. 3(E) and produced by the low level time-shared address 255. Then, the output signal of an AND gate which performs the AND operation on the address signal appearing in the predetermined time-shared address and the level signal 312 is applied to the set input of the first memory circuit. Consequently, the application of this AND signal clears the previously established initial state, while the initial state is maintained when no signal is applied to the set input. Namely, the state of the first memory circuit is determined depending upon whether there is a level signal in the respective time-shared intervals. This state is again cleared by the following reset signal 313 and the initial state is restored. To transfer the content of the first memory circuit to a second memory circuit before the former is cleared, a gate is provided between the first and second memory circuits to control the transmission of signals therebetween, and the transfer signal 315 which is shown in FIG. 3(G) and which is the logical product of the address 255 and the strobe signal 314 shown in FIG. 3(F) is applied to this gate. For instance, if the level signal 312 of FIG. 3(C) has the transmitting signal on the address 022 (or it has a low level therein), the content of the first memory circuit is continuously fed to and stored in the second memory circuit during the duration of the signal 316 shown in FIG. 3(H) from the transfer signal 315 of FIG. 3(G) in the period to the transfer signal 315 in the next period, whereas when the transmitting signal is on the address 115, the content of the first memory circuit is continuously stored in the second memory circuit in the similar manner, but during the duration of the signal 317 shown in FIG. 3(I). Therefore, if the signal remains on the address 115 of the level signal 312, the signal 317 also remains on even after the transfer signal 315 in the second period. In response to this signal 316 or 317, the actuating means in the actuating section (FIG. 1) which corresponds to the specified address actuates the associated load.

Figure 4:
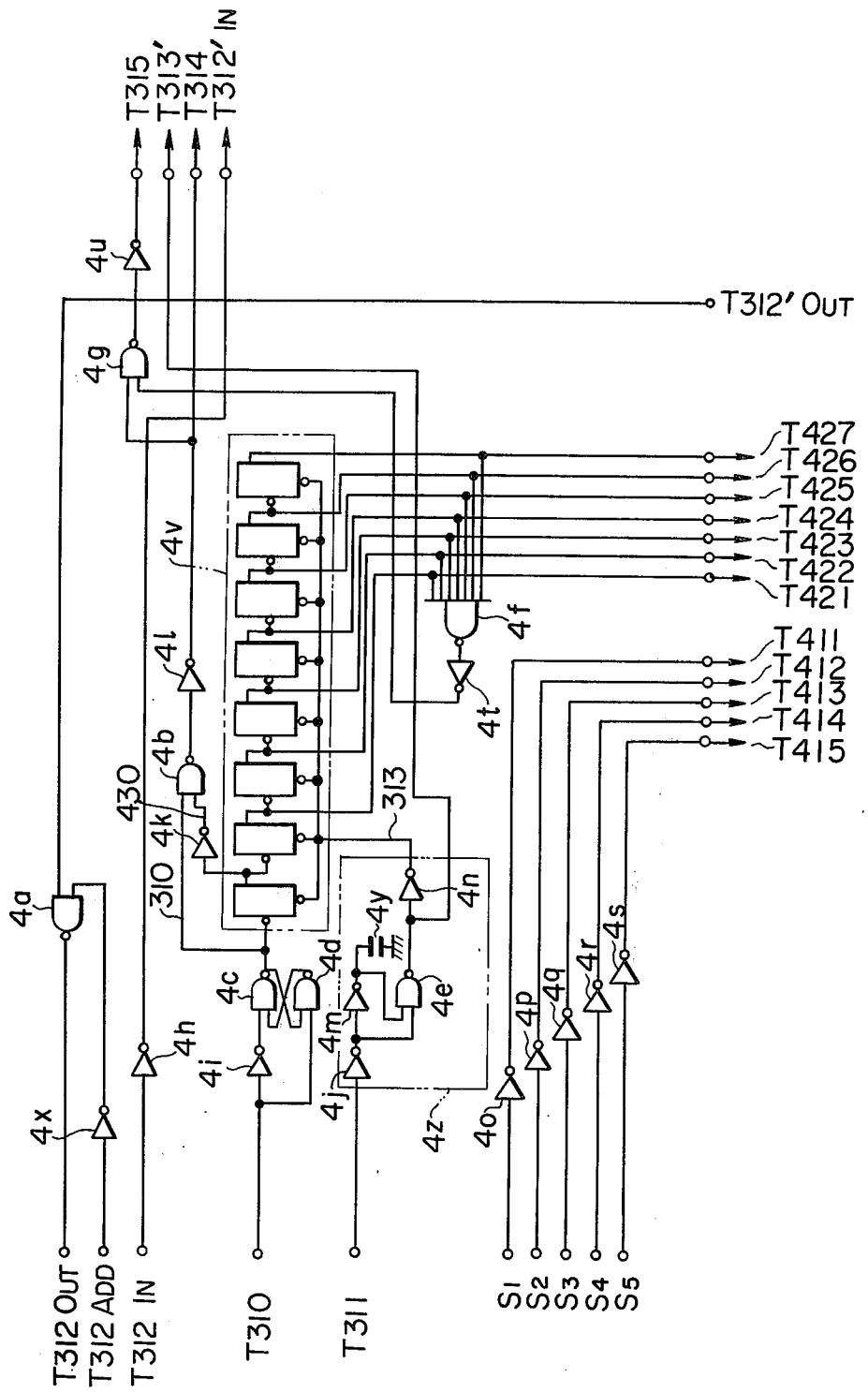
FIG. 4 is a wiring diagram showing the detailed circuit construction of the counting block used in the transmitting and receiving unit shown in FIG. 2.

The signal transmission according to the above-described time-sharing system will now be described with reference to the detailed circuit construction of the component elements in each local. Referring to FIG. 4 illustrating the internal wiring diagram of a counting block $A_a$ in the transmitter and receiver unit shown in FIG. 2, numerals 4a, 4b, 4c, 4d, 4e, 4f and 4g designate NAND gates, 4h, 4i, 4j, 4k, 4l, 4m, 4n, 4o, 4p, 4q, 4r, 4s, 4t, 4u and 4x inverter gates, 4v a frequency dividing circuit, 4y a capacitor. The inverter gates 4i, 4m and 4n and the NAND gate 4e and the capacitor 4y constitute a reset circuit 4z for the frequency dividing circuit 4v. In operation, when the synchronous signal 311 shown in FIG. 3(B) is applied to the terminals T311 in FIG. 4, the NAND gate 4e performs the logical operation on this signal and the one delayed by the capacitor 4y, and the inverter gate 4n generates at its output the reset signal 313 shown in FIG. 3(E) to place the frequency dividing circuit 4v in the initial state. The timing signal 310 shown in FIG. 3(A) is applied to the terminal T310 of FIG. 4 and it is then applied to the input of the frequency dividing circuit 4v by way of the reshaping circuit constituted by the NAND gates 4c and 4d and the inverter gate 4i. The NAND gate 4b performs the logical operation on the timing signal 310 from the reshaping circuit and the inverted output signal of the first state flip-flop in the frequency dividing circuit 4v, and its output signal is then inverted to generate the strobe signal 314 shown in FIG. 3(F). The timing signal 310 is successively frequency divided by the frequency dividing circuit 4v so that the output signals 421, 422, 423, 424, 425, 426 and 427 respectively shown in FIGS. 3(J), 3(K), 3(L), 3(M), 3(N), 3(O) and 3(P) are generated from the respective flip-flops. A plurality of signal lines for carrying these output signals are indicated, for convenience of illustration, by one line in the block diagram of FIG. 2. When all of the outputs of the frequency dividing circuit 4v have a 1 signal, that is, when the time-shared address 255 has been reached, the output signal of the NAND gate 4f goes to 0. This 0 signal is inverted by the inverter gate 4t and it is then applied to the NAND gate 4g which in turn performs the logical operation on this inverted signal and the strobe signal 314 to produce the transfer signal 315 shown in FIG. 3(G). The five terminals $S_1$, $S_2$, $S_3$, $S_4$ and $S_5$ are terminals for selectively operating the transmitting and receiving blocks in the transmitter and receiver unit. Thus, by setting each of these terminals to either a 1 or 0 signal, it is possible to make $2^5$ kinds or 32 kinds of selection. These signals which are each set to either 1 or 0 are respectively inverted by the inverter gates 4c, 4p, 4q, 4r and 4s to produce signals 411, 412, 413, 414 and 415. A plurality of signal lines for carrying these output signals are indicated, for convenience of illustration, by one line in the block diagram of FIG. 2. The signals described so far are applied to the respective elements of the transmitting and receiving blocks $A_{01}$, $A_{02}$, . . ., $A_{27}$ in the transmitter and receiver unit shown in FIG. 2.

Figure 5:
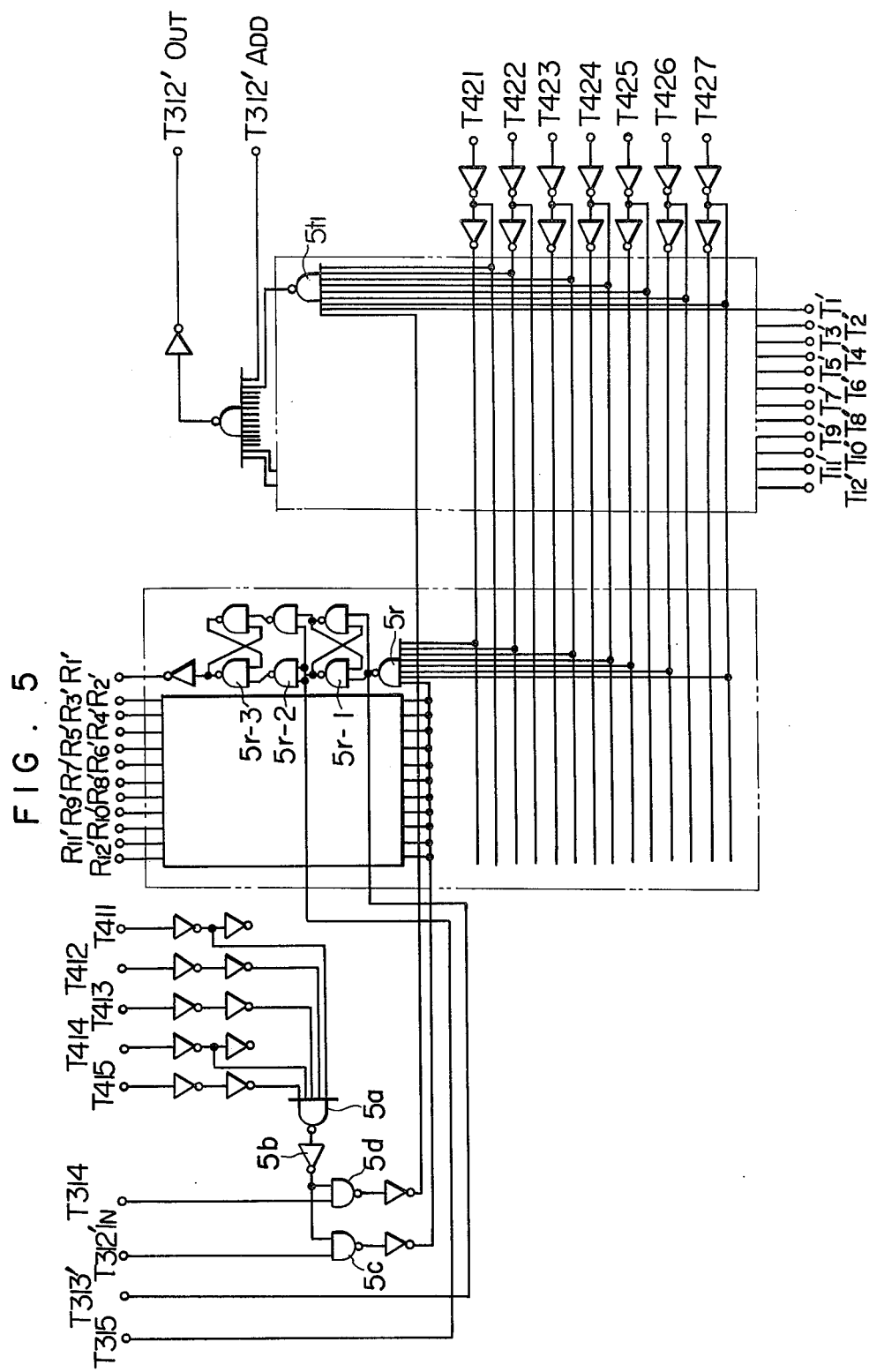
FIG. 5 is a wiring diagram showing the detailed circuit construction of a transmitting and receiving block forming part of the transmitter and receiver unit shown in FIG. 2.

FIG. 5 illustrates the internal circuit construction of the transmitting and receiving block. The transmitting and receiving block of FIG. 5 is composed of NAND gates and inverter gates, and it is assumed that this block comes into operation only when there are a 1 signal at the terminal $S_1$, a 0 signal at $S_2$, a 0 signal at $S_3$, a 1 signal at $S_4$ and a 0 signal at $S_5$. In this case, by setting the inputs to the terminals $S_1$, $S_2$, $S_3$, $S_4$ and $S_5$ shown in FIG. 4 in the manner described above, the output of a NAND gate 5a has a 0 signal and this signal is inverted by an inverter gate 5b. Consequently, the inverted 1 signal opens NAND gates 5c and 5d, and the transmitting and receiving circuits shown in FIG. 5 come into operation. For example, if it is assumed that of the terminals $T_1$, $T_2$, . . ., $T_{12}$ which are connected to switches, sensors, etc., the switch terminal $T_1$ corresponds to the time-shared address 002, the signal 422 of FIG. 3(K), the inverted signals of the signals 421, 423, 424, 425, 426 and 427 respectively shown in FIGS. 3(J), 3(L), 3(M), 3(N), 3(O) and 3(P) and the strobe signal 314 are applied to a NAND gate $5t_1$. When the switch terminal $T_1$ has a 0 signal, it is inverted by an inverter gate and applied to a terminal $T_1'$ so that a terminal $T312'_{out}$ in FIG. 5 receives the level signal 312 shown in FIG. 3(C) in which the time-shared address 002 has a 0 level. This applied equally to other terminals $T_2$, $T_3$, . . ., $T_{27}$ for the switches, etc., and the address signals 421, 422, 423, 424, 425, 426 and 427 are connected so that the address corresponding to the respective switches and so on can be obtained.

Figure 6A:
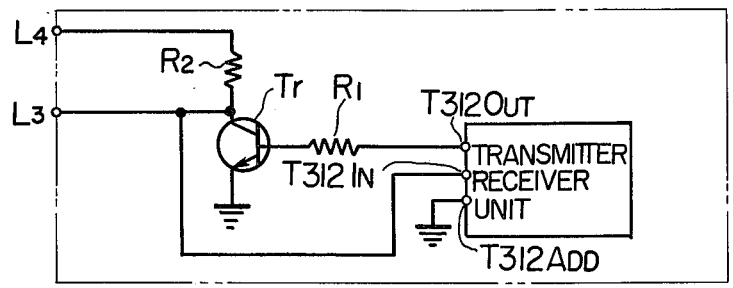
FIGS. 6a and 6b are block diagrams showing the interconnections of the transmitter and receiver units of the form shown in FIG. 2.
Figure 6B:
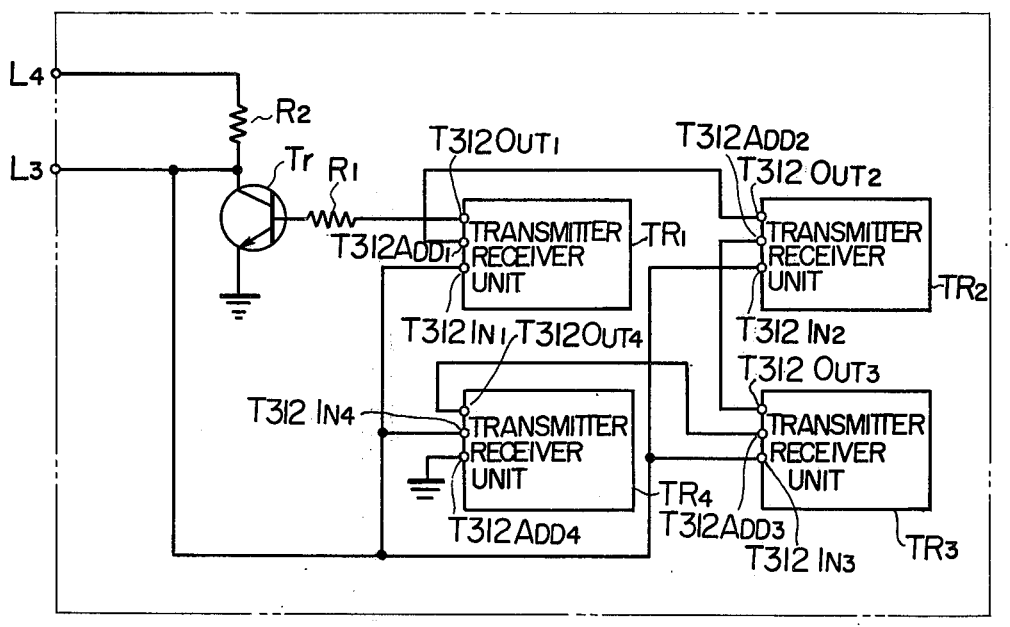

On the other hand, assume that of the terminals $R_1, R_2, \ldots, R_{12}$ connected to the actuating section for actuating the loads such as wipers and head lamps, the load terminal $R_1$ corresponds to the time-shared address 115. In this case, in the similar manner as described above, the address signals 421, 422, 425 and 426 and the inverted signals of the address signals 423, 424 and 427 are applied to the inputs of a NAND gate 5r, and the level signal 312 shown in FIG. 3(C) and inverted by the inverter gate 4h of FIG. 4 is applied to a terminal $T312'_{in}$. Consequently, the NAND gate 5r produces a 0 output signal only when the time-shared address 115 is reached, and this changes the output of the first memory circuit which has previously been placed in the initial state by the reset signal 313' of FIG. 4 which was applied to a terminal T313' of FIG. 5. In other words, the output of a NAND gate 5r-1 has a 1 signal. The transfer signal 315 of FIG. 4 is applied to the terminal T315 of FIG. 5 so that a NAND gate 5r-2 opens and the content of the first memory circuit is transferred to the second memory circuit. This transfer signal causes a NAND gate 5r-3 to produce a 1 signal at its output and a 0 signal appears at a terminal $R_1'$. Consequently, the 1 signal which was inverted by an inverter gate is applied to the load terminal $R_1$ of FIG. 2 and the actuating section is controlled to actuate the corresponding load. To simplify the illustration, circuitry, corresponding to that just described, by which signals may be produced at terminals $R_2' - R_{12}'$, has been replaced by the solid line block in FIG. 5. Further, by connecting a terminal $T312'_{add}$ of FIG. 5 to the terminal $T312'_{out}$ of other transmitting and receiving blocks, the signals transmitted from the plurality of the transmitting and receiving blocks in the transmitter and receiver unit of FIG. 2 are combined at a terminal $T312'_{out}$ of the transmitting and receiving block $A_{01}$ of FIG. 2, and it appears at the terminal $T312'_{out}$ shown in FIG. 4 from which it is applied to the NAND gate 4a and this combined signal appears at the output terminal $T312_{out}$. As shown in FIG. 6a, the signal appeared at the output terminal $T312_{out}$ is applied through a resistor $R_1$ to the base of a transistor Tr and its inverted signal appears at the collector thereof. The collector of the transistor Tr is connected to the terminal $T312_{in}$ and it is also connected to the level signal line $L_3$ to transmit and receive signals from any other locals. In the case that a plurality of the transmitter and receiver units are employed to effect the transmission and reception of signals, as shown in FIG. 6b, a terminal $T312_{out4}$ of a first transmitter and receiver and receiver unit $TR_4$ is connected to a terminal $T312_{add3}$ of a second transmitter and receiver unit $TR_3$ whose terminal $T312_{out3}$ is in turn connected to a terminal $T312_{add2}$ of a third transmitter and receiver unit $TR_2$, and a terminal $T312_{out2}$ of the transmitter and receiver unit $TR_2$ is in turn connected to a terminal $T312_{add1}$ of a fourth transmitter unit $TR_1$. In this way, the signals to be transmitted are combined at the terminal $T312_{out1}$ of the transmitting and receiving unit $TR_1$ and it is delivered as the level signal 312 to the level signal line $L_3$ through the transistor Tr. In this case, the input signals from the level signal line $L_3$ are applied to the respective terminals $T312_{in}$ of the transmitter and receiver units $TR_1, TR_2, TR_3$ and $TR_4$, thus permitting the transmission and reception of signals with other locals.

The method of selecting the desired transmitter and receiver units will be described more specifically with reference to the illustrated embodiment. The following Table 1 is a list of the addresses assigned to the actuating means such as switches, sensors, etc., and the loads such as lamps, motors, etc., mounted in an automotive vehicle. In the Table 1, a symbol T designates the transmitting areas and R designates the destinations for the transmitted signals. Symbols (T) and (R) indicate respectively that the transmission and reception are possible.

Table 1

| Address | A | B | C | D | E | G | F | Item |
|---|---|---|---|---|---|---|---|---|
| 000 | | | | | | | | |
| 001 | T | | | | | | R | Throttle position 2 |
| 002 | T | | | | | | R | Throttle position 4 |
| 003 | T | | | | | | R | Throttle position 6 |
| . | . | | | . | | | . | |
| . | . | | | . | | | . | |
| . | . | | | . | | | . | |
| . | . | | | . | | | . | |
| . | . | | | . | | | . | |
| 012 | T | | | | | | R | |
| 013 | T | | | | | | R | Headlamp A burnt out |
| 014 | T | | | | | | R | Headlamp B burnt out |
| . | | | | | | | | |
| . | | | | | | | | |
| . | | | | | | | | |
| 022 | | T | | | | | R | Faulty air bag 5 |
| 023 | (T) | T | | | | | R | Faulty air bag 6 |
| 024 | T | (T) | | | | | R | Front brake oil level |
| 025 | T | | | | | | R | Rear brake oil level |
| 026 | T | (T) | | . | | | R | Front brake oil pressure |
| 027 | T | (T) | | | | | R | Rear brake oil pressure |

Table 1-continued

| Address | A | B | C | D | E | G | F | Item |
|---|---|---|---|---|---|---|---|---|
| . | . | . | | | | | . | |
| . | . | . | | | | | . | |
| . | . | . | | | | | . | |
| 034 | T | (T) | (T) | (T) | (T) | (T) | R | Faulty relays $K_1$, $L_1$ |
| 035 | | T | (T) | | | | R | Faulty relay $K_2$ |
| 036 | | T | T | R | | | R | |
| 037 | | T | (T) | (R) | | | R | |
| 038 | R | R | (R) | (R) | (R) | (R) | T | |
| 039 | | R | | (R) | | | T | |
| . | . | | | | | | . | |
| . | . | | | | | | . | |
| . | . | | | | | | . | |
| 049 | | R | | | | | T | |
| 050 | | R | | | | | T | Actuate headlamp A |
| 051 | | R | | | | | T | Actuate headlamp B |
| 052 | | R | | | | | T | Actuate headlamp BM |
| . | . | | | | | | . | |
| . | . | | | | | | . | |
| . | . | | | | | | . | |
| 061 | | R | | | | | T | |
| 062 | | R | | | | | T | Actuate wiper motor at high speed |
| 063 | | R | | | | | T | Actuate wiper motor at low speed |
| 064 | | R | | | | | T | |
| 065 | | R | | | | | T | |
| 066 | R | R | | | | | T | Actuate starter & ignition coil |
| 067 | R | | | | | | T | Actuate solenoid AC |
| . | . | | | | | | . | |
| . | . | | | | | | . | |
| . | . | | | | | | . | |
| 076 | R | | | | | | T | Actuate headlamp F |
| . | . | | | | | | . | |
| . | . | | | | | | . | |
| . | . | | | | | | . | |
| 088 | R | R | | T | | | R | |
| 089 | | R | | T | | | R | |
| . | . | | | . | | | . | |
| . | . | | | . | | | . | |
| . | . | | | . | | | . | |
| 094 | | (R) | | T | | | R | Failure to turn off key switch |
| 095 | T | | | | | | R | |
| . | . | | | | | | . | |
| . | . | | | | | | . | |
| . | . | | | | | | . | |
| 106 | T | | (T) | (R) | (T) | (T) | R | Front and rear tire pressures |
| 107 | | | (T) | T | (T) | (T) | R | Headlamp dimmer |
| . | . | | | | | | . | |

Table 1-continued

| Address | Local | | | | | | | Item |
|---|---|---|---|---|---|---|---|---|
| | A | B | C | D | E | G | F | |
| . | | | | | | | | |
| . | | | | | | | | |
| . | | | | | | | | |
| . | | | | | | | | |
| . | | | | | | | | |
| . | | | | | | | | |
| 143 | | | | T | | | R | Wiper low speed switch |
| 144 | | | | T | | | R | Wiper high speed switch |
| . | | | | | | | | |
| . | | | | | | | | |
| . | | | | | | | | |
| . | | | | | | | | |
| 254 | | | | | | R | T | Side lamp BMRR |
| 255 | | | | | | | | Memo |

In other words, the local A in FIG. 1 can transmit the signals from switches, etc. during the time intervals corresponding to the addresses 023 through 034 and the addresses 095 through 106, and the loads such as lamps in the local A can receive signals and operate during the address 038 and the addresses 066 through 088. In the local B, the signals from switches, etc. are sent out during the addresses 001 through 024 and the addresses 026 through 037, while signals are received to actuate the loads during the addresses 038 through 066 and the addresses 088 through 094. The remaining locals C, D, E, F and G transmit and receive signals in like manner. For example, when a head lamp A listed in the Table 1 is burnt out, a signal indicating the burning out of the lamp is transmitted on the address 013 from the local B to the local F. When this occurs, the local F sends out on the address 051 a command signal which instructs a head lamp B to replace the head lamp A, and this command signal is received by the local B which in turn causes the head lamp B to go on and serve as a substitute for the head lamp A. On the other hand, when the local D sends out a signal on the address 143 which is alloted to a wiper low speed switch, the local F, upon receipt of this signal, sends out on the address 063 a command signal that operates the wiper motor at a lower speed and the command signal is received by the local B to operate the wiper motor at the lower speed. It will thus be seen that according to the illustrated embodiment, all the signals are received by the local F so that the logical operation is performed on those signals requiring such operation, and the necessary command signals for actuating the loads in the locals A, B, C, D, E and G are sent out from the local F. In this way, the above-described allotment of the addresses to the transmitting and receiving blocks $A_{01}$, $A_{02}$, ..., $A_{27}$ in the transmitter and receiver unit of FIG. 2 is effected in accordance with the Table 1. For example, the addresses are allotted so that the transmitting and receiving block $A_{01}$ transmits signals on the addresses 001 through 012 and receives signals on the addresses 038 through 049; the transmitting and receiving block $A_{02}$ transmits signals on the addresses 013 through 024 and receives signals on the addresses 050 through 061; the transmitting and receiving block $A_{03}$ transmits signals on the addresses 026 through 037 and receives signals on the addresses 062 through 066 and the addresses 088 through 094; and the remaining transmitting and receiving blocks $A_{04}$ through $A_{27}$ transmit and receive signals as shown in Table 2.

TABLE 2

| Transmission Block | Reception | 1 | 2 | 3 | 4 | 5 | 6 | 7 | 8 | 9 | 10 | 11 |
|---|---|---|---|---|---|---|---|---|---|---|---|---|
| $A_{01}$ | T | 001 | 002 | 003 | 004 | 005 | 006 | 007 | 008 | 009 | 010 | 011 | 012 |
| | R | 038 | 039 | 040 | 041 | 042 | 043 | 044 | 045 | 046 | 047 | 048 | 049 |
| $A_{02}$ | T | 013 | 014 | 015 | 016 | 017 | 018 | 019 | 020 | 021 | 022 | 023 | 024 |
| | R | 050 | 051 | 052 | 053 | 054 | 055 | 056 | 057 | 058 | 059 | 060 | 061 |
| $A_{03}$ | T | 026 | 027 | 028 | 029 | 030 | 031 | 032 | 033 | 034 | 035 | 036 | 037 |
| | R | 062 | 063 | 064 | 065 | 066 | 088 | 089 | 090 | 091 | 092 | 093 | 094 |
| $A_{04}$ | T | 023 | 024 | 025 | 026 | 027 | 028 | 029 | 030 | 031 | 032 | 033 | 034 |
| | R | 038 | 066 | 067 | 068 | 069 | 070 | 071 | 072 | 073 | 074 | 075 | 076 |
| $A_{05}$ | T | 095 | 096 | 097 | 098 | 099 | 100 | 101 | 102 | 103 | 104 | 105 | 106 |
| | R | 077 | 078 | 079 | 080 | 081 | 082 | 083 | 084 | 085 | 086 | 087 | 088 |

TABLE 2-continued

| Transmission Block | Reception | 1 | 2 | 3 | 4 | 5 | 6 | 7 | 8 | 9 | 10 | 11 | 12 |
|---|---|---|---|---|---|---|---|---|---|---|---|---|---|
| $A_{13}$ | T | 034 | 038 | 105 | 106 | 107 | 161 | 213 | 214 | 215 | 216 | 217 | 218 |
|  | R | 231 | 232 | 233 | 234 | 235 | 236 | 237 | 238 | 239 | 240 | 241 | 242 |
| . | . | . | . | . | . | . | . | . | . | . | . | . | . |
| . | . | . | . | . | . | . | . | . | . | . | . | . | . |
| . | . | . | . | . | . | . | . | . | . | . | . | . | . |
| $A_{24}$ | T | 231 | 232 | 233 | 234 | 235 | 236 | 237 | 238 | 239 | 240 | 241 | 242 |
|  | R | 158 | 159 | 160 | 161 | 211 | 212 | 213 | 214 | 215 | 216 | 217 | 218 |
| $A_{25}$ | T | 243 | 244 | 245 | 246 | 247 | 248 | 249 | 250 | 251 | 252 | 253 | 254 |
|  | R | 219 | 220 | 221 | 222 | 223 | 224 | 225 | 226 | 227 | 228 | 229 | 230 |

The Table 2 is a list of the addresses on which the transmitting and receiving blocks $A_{01}$ through $A_{25}$ of the blocks $A_{01}, A_{02}, \ldots, A_{27}$ of FIG. 2 can transmit and receive signals, and symbols $A_{01}$ through $A_{25}$ shown in the left column indicate the names of the transmitting and receiving blocks. The Table 2 indicates that if, in the transmitter and receiver unit of FIG. 2, the transmitting and receiving block $A_{01}$ is for example selected by the selector terminals $S_1$ through $S_5$, signals can be transmitted on the addresses 001, 002, 003, 011 and 012 through the terminals $T_1$, $T_2$, $T_3$, ..., $T_{12}$, and signals can be received on the addresses 038, 039, 040, 048 and 049 through the terminals $R_1$, $R_2$, ..., $R_{12}$, whereas when the transmitting and receiving block $A_{13}$ is selected by the selector terminals $S_1$ through $S_5$, signals can be transmitted on the addresses 034, 038, 105, 106, 107, 161, 213 and 218 through the terminals $T_1$, $T_2$, ..., $T_{12}$, and signals can be received on the addresses 231, 232, ..., 242 through the terminals $R_1$, $R_2$, ..., $R_{12}$. With the addresses allotted in the manner described above, in order that the local A may perform its required signal transmission and reception, the selector terminals $S_1$ through $S_5$ in the transmitter and receiver unit of FIG. 2 are preset so that the terminal $S_1$ has a 0 signal, $S_2$ a 0 signal, $S_3$ a 1 signal, $S_4$ a 0 signal and $S_5$ a 0 signal to select and actuate only transmitting and receiving block $A_{04}$, while in another transmitter and receiver unit the terminal $S_1$ has a 1 signal, $S_2$ a 0 signal, $S_3$ a 1 signal, $S_4$ a 0 signal and $S_5$ a 0 signal to similarly actuate only the transmitting and receiving block $A_{05}$. In this way, all the signal transmission and reception requirements of the local A which are indicated in the Table 1 can be satisfied with two units of the transmitter and receiver unit shown in FIG. 2. In the like manner, the other locals can accomplish the transmission and reception of all the signals allotted thereto in the Table 1. In other words, the local B employs three transmitting and receiving blocks $A_{01}$, $A_{02}$ and $A_{03}$ thus requiring three transmitter and receiver units, the local C employs two transmitting and receiving blocks $A_{06}$ and $A_{07}$ and hence it requires two transmitter and receiver units, the local D requires two transmitter and receiver units since it employs two transmitting and receiving blocks $A_{08}$ and $A_{09}$, the local E requires three transmitter and receiver units since it employs three transmitting and receiving blocks $A_{10}$, $A_{11}$ and $A_{12}$, the local G employs two transmitting and receiving blocks $A_{13}$ and $A_{14}$ thus requiring two transmitter and receiver units, and the local F requires 11 transmitter and receiver units since its employs 11 transmitting and receiving blocks $A_{15}$, $A_{16}$, $A_{17}$, $A_{18}$, $A_{19}$, $A_{20}$, $A_{21}$, $A_{22}$, $A_{23}$, $A_{24}$ and $A_{25}$. Therefore, the signal transmission and reception requirements shown in the Table 1 can be satisfied entirely by using 25 units of the transmitter and receiver unit shown in FIG. 2.

While, in the embodiment described above, the number of the transmitting and receiving blocks is 25 or 27, the present invention is not limited thereto and it may be increased as desired with a corresponding increase in the number of the associated selector terminals. In addition, the number of addresses may be changed as desired by varying the number of flip-flops in the frequency dividing circuit. Further, while the logical operation for the strobe signal is performed on the sending side to produce the level signal 312, this may be performed on the receiving side through the same logical operation.

It will thus be seen from the foregoing description that the system according to the invention comprises a plurality of local blocks each thereof including a plurality of transmitter and receiver units each of which includes a plurality of detecting terminals for connection to a plurality of sensors each having its assigned address and a plurality of terminals for connection to a plurality of actuating means each having its assigned address and is capable of performing the function of transmitting and receiving signals, and each of said transmitter and receiver units is composed of a plurality of transmitting and receiving blocks, a plurality of selector terminals for selecting and causing one of the transmitting and receiving blocks to serve the signal transmitting and receiving functions, a frequency dividing circuit for dividing the frequency of a reference signal, a reset circuit for receiving a synchronous signal to reset the frequency dividing circuit, and a logical circuit for receiving a plurality of divided output signals from the frequency dividing circuit and a signal from the detecting terminal to generate a level signal indicative of a selected address, whereby permitting the transmission and reception of signals among the addresses. The effect of this novel arrangement is that it offers a reduction in the amount of electric wires used as well as in the space required for wiring, weight and cost of the wires. Further, since it is possible to standardize the transmitter and receiver units provided in each local block, the systems constructed according to the teachings of this invention can be satisfactorily handled by the ordinary mechanics who engage in the servicing of automobiles and who possess no technical knowledge required in the art of time-sharing pulse transmission system. Further, the number of terminals in the transmitter and receiver unit which are connected to the sensors and the actuating means can be reduced to a minimum number corresponding to the number of addresses associated with the multiplex signal transmission and reception functions of a single transmitting and receiving block.

What is claimed is:

1. An electric wiring system for interconnecting a plurality of local blocks each thereof including a transmitter and receiver unit having transmitting and receiving functions and a plurality of terminals and a plurality of terminals means each thereof having an assigned address connected respectively to each of said terminals, wherein at least one of said plurality of local blocks further includes oscillator means for generating a reference signal and means for generating a synchronous signal having a period of desired cycle of said reference signal, and wherein each of said transmitter and receiver units includes a plurality of transmitting and receiving blocks commonly connected to said terminals, a plurality of selector terminals for applying selecting signals to select one of said transmitting and receiving blocks corresponding to the assigned address of said terminal means and a counting block for receiving said synchronous signal and reference signal and for time-dividing each period of said synchronous signal by said reference signal to designate the address in order and for making the designated address agree with said assigned address and for applying said designated address to said transmitting and receiving blocks, thereby accomplishing transmission and reception of signals among said local blocks corresponding to said assigned address by said transmitting and receiving blocks selected by said selecting signals.

2. A system according to claim 1, wherein said terminal means comprises a plurality of sensors.

3. A system according to claim 1, wherein said terminal means comprises a plurality of actuating means.

4. A system according to claim 1, wherein said selecting signals for selecting one of said transmitting and receiving blocks corresponding to the same specific address are added to a selector terminal of each transmitter and receiver unit in first and second local blocks, and a plurality of sensors are connected to the terminal means of said first local block and a plurality of driving means are connected to the terminal means of said second local block, thereby each of said driving means corresponding to each specific address of said sensors is driven.

5. An electric wiring system for interconnecting a plurality of local blocks each thereof including a transmitter and receiver unit, said transmitter and receiver unit including a plurality of detecting terminals respectively connected to a plurality of sensors each having an assigned address and a plurality of terminals respectively connected to a plurality of actuating means each having an assigned address, each said transmitter and receiver unit serving signal transmitting and receiving functions, wherein at least one of said plurality of local blocks further includes oscillator means for generating a reference signal and means for generating a synchronous signal, and wherein each said transmitter and receiver unit includes a plurality of transmitting and receiving blocks, a plurality of selector terminals for selecting and causing one of said plurality of transmitting and receiving blocks to perform the signal transmitting and receiving functions, a frequency dividing circuit for dividing the frequency of said reference signal, a reset circuit for receiving said synchronous signal to reset said frequency dividing circuit, and a logical circuit for receiving a plurality of frequency-divided output signals of said frequency dividing circuit and a signal from one of said detecting terminals to generate a level signal designating a corresponding one said assigned addresses, whereby accomplishing the transmission and reception of signals among said assigned addresses.

6. A system according to claim 5, wherein each said transmitter and receiver unit includes a counting block for dividing the frequency of said reference signal for every period of said synchronous signal to generate an address signal corresponding to each of said addresses, a plurality of transmitting and receiving blocks adapted to received said address signal from said counting block and operatively associated with the signal transmitting and receiving functions of said plurality of local blocks, and a plurality of selector terminals for selecting and causing one of said plurality of transmitting and receiving blocks to effect a time-shared multiplex signal transmission and reception according to said address signal, whereby to accomplish said signal transmission and reception among said addresses.

7. A system according to claim 5, wherein one of said plurality of local blocks further includes logical processing means for receiving and performing a logical operation such as a check on a signal transmitted from each of said plurality of local blocks and sending back thereto a resultant command signal.

8. A system according to claim 5, wherein each of said transmitting and receiving blocks serves multiplex signal transmission and receiving functions involving a number of addresses corresponding to the number of said terminals connected to said plurality of sensors and actuating means.

9. A system according to claim 5, wherein said reference signal and said synchronous signal are respectively transmitted along a separate transmission line.

* * * * *